United States Patent
Gupta (10) Patent No.: US 10,268,904 B2
(45) Date of Patent: Apr. 23, 2019

(54) VEHICLE VISION SYSTEM WITH OBJECT AND LANE FUSION

(71) Applicant: MAGNA ELECTRONICS INC., Auburn Hills, MI (US)

(72) Inventor: Nikhil Gupta, Brampton (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 234 days.

(21) Appl. No.: 15/221,913

(22) Filed: Jul. 28, 2016

(65) Prior Publication Data

US 2017/0032196 A1 Feb. 2, 2017

Related U.S. Application Data (60) Provisional application No. 62/199,430, filed on Jul. 31, 2015.

(51) Int. Cl.
*G06K 9/00* (2006.01)
*G06K 9/62* (2006.01)

(52) U.S. Cl.
CPC .......... *G06K 9/00798* (2013.01); *G06K 9/629* (2013.01); *G06T 2207/10016* (2013.01); *G06T 2207/20076* (2013.01); *G06T 2207/30256* (2013.01)

(58) Field of Classification Search
CPC ............... G06K 9/00798; G06K 9/629; G06T 2207/10016; G06T 2207/30256; G06T 2207/20076
USPC ........................................................ 382/104
See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,949,331 A | 9/1999 | Schofield et al. | |
| 2006/0177099 A1* | 8/2006 | Zhu | G06K 9/00335 382/104 |
| 2008/0273752 A1* | 11/2008 | Zhu | B60W 40/02 382/103 |
| 2014/0169627 A1 | 6/2014 | Gupta | |
| 2014/0347486 A1 | 11/2014 | Okouneva | |
| 2014/0350834 A1 | 11/2014 | Turk | |
| 2015/0002670 A1 | 1/2015 | Bajpai | |
| 2015/0175072 A1 | 6/2015 | Sabeti | |
| 2015/0178576 A1 | 6/2015 | Gupta | |
| 2015/0219462 A1* | 8/2015 | Stumper | G01C 21/00 701/410 |
| 2015/0291215 A1 | 10/2015 | Bajpai et al. | |

(Continued)

*Primary Examiner* — Amandeep Saini
(74) *Attorney, Agent, or Firm* — Honigman LLP (57) ABSTRACT

A vision system of a vehicle includes at least one camera configured to be disposed at a vehicle so as to have a field of view exterior and forward of the vehicle, and at least one other sensor configured to be disposed at a vehicle so as to have a sensing field exterior of the vehicle. A processor is operable to process data captured by the camera and the sensor. Responsive to processing of captured data, the processor determines an object present in the sensing field of the sensor. Responsive to processing of image data captured by the camera, the processor determines lane markings present in the field of view of the camera and forward of the vehicle. The processor receives object hypotheses, sensor properties and vehicle data as inputs and performs a data transformation to generate fused object hypotheses.

20 Claims, 7 Drawing Sheets

(56) References Cited

U.S. PATENT DOCUMENTS

| | | |
|---|---|---|
| 2016/0180158 A1 | 6/2016 | Gupta et al. |
| 2016/0180180 A1 | 6/2016 | Gupta et al. |
| 2016/0180182 A1 | 6/2016 | Gupta et al. |
| 2016/0325682 A1 | 11/2016 | Gupta et al. |
| 2016/0335510 A1 | 11/2016 | Gupta et al. |
| 2017/0017848 A1 | 1/2017 | Gupta et al. |
| 2017/0032198 A1 | 2/2017 | Gupta et al. |

* cited by examiner

VEHICLE VISION SYSTEM WITH OBJECT AND LANE FUSION

CROSS REFERENCE TO RELATED APPLICATION

The present application claims the filing benefits of U.S. provisional application Ser. No. 62/199,430, filed Jul. 31, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and, responsive to image processing of captured image data, determines objects present exterior of the vehicle. The system receives object hypotheses, sensor properties and vehicle inputs (such as via a CAN bus communication) as inputs and performs a data transformation to generate fused object hypotheses. The data transformation includes core fusion (comprising synched frame-hypotheses fusion and temporal hypotheses propagation and temporal smoothing and prediction) and higher level tasks (such as trajectory/velocity estimation and high level system logic). The system may provide synched frame-hypotheses fusion (spatial fusion), where a cost matrix calculation and optimal assignment and property association/merging are done to generate the fused object hypotheses.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
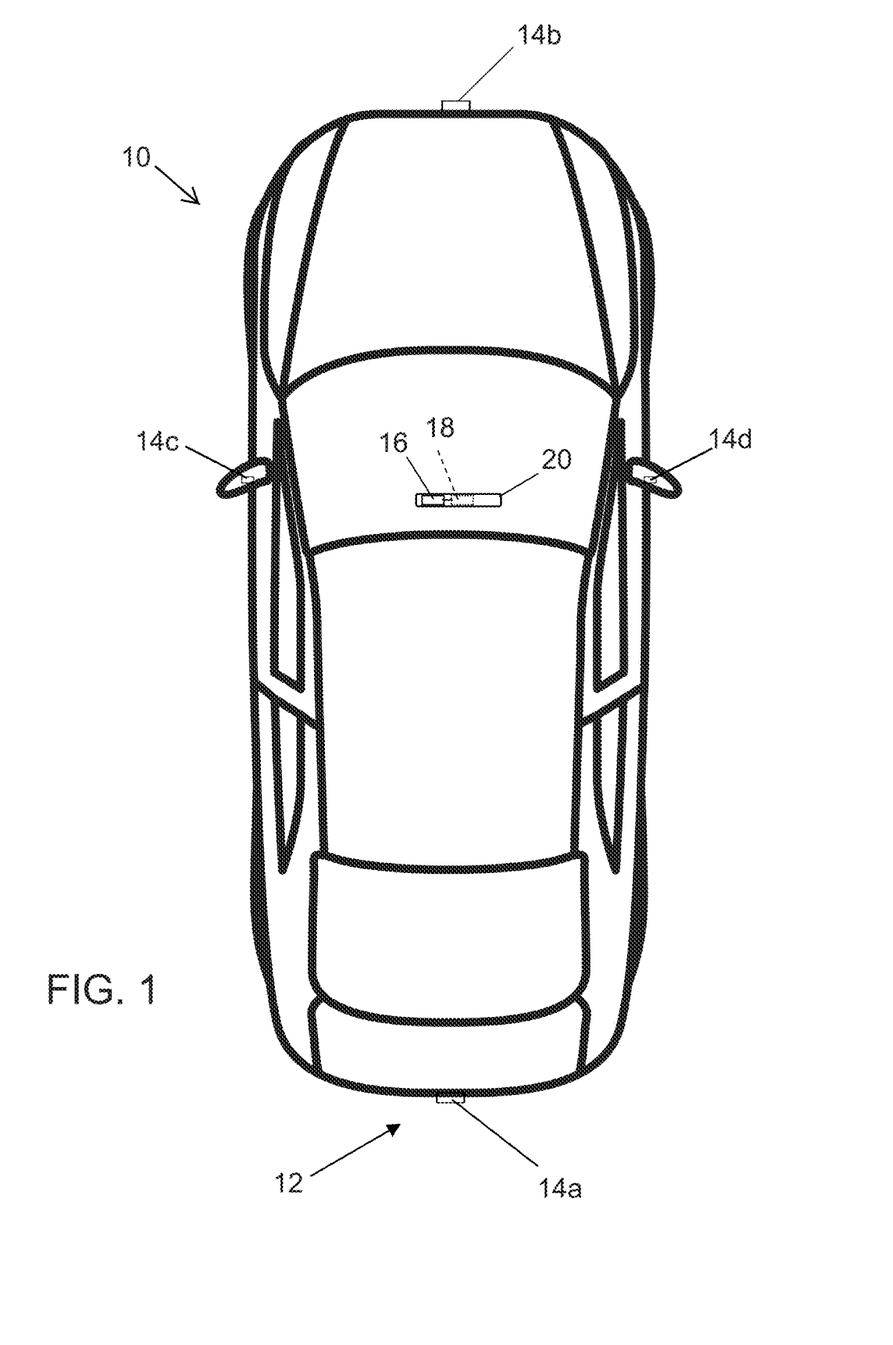
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The present invention comprises a system and control and processor that provides fusion of detected objects output by multiple sensors. The system includes or receives data from various sensors, which may all be cameras or different types of sensors (such as, for example, ultrasonic sensors, radar sensors, lidar sensors and/or the like). The system may provide fusion of detected lanes output by multiple sensors and robust tracking of objects across various sensor transitions. The system also provides an estimation of trajectory and velocity vectors of the fused and tracked objects. Transformation of object data for localization in multiple output views, such as a top view or surround view and/or panoramic views and/or the like.

Figure 2:
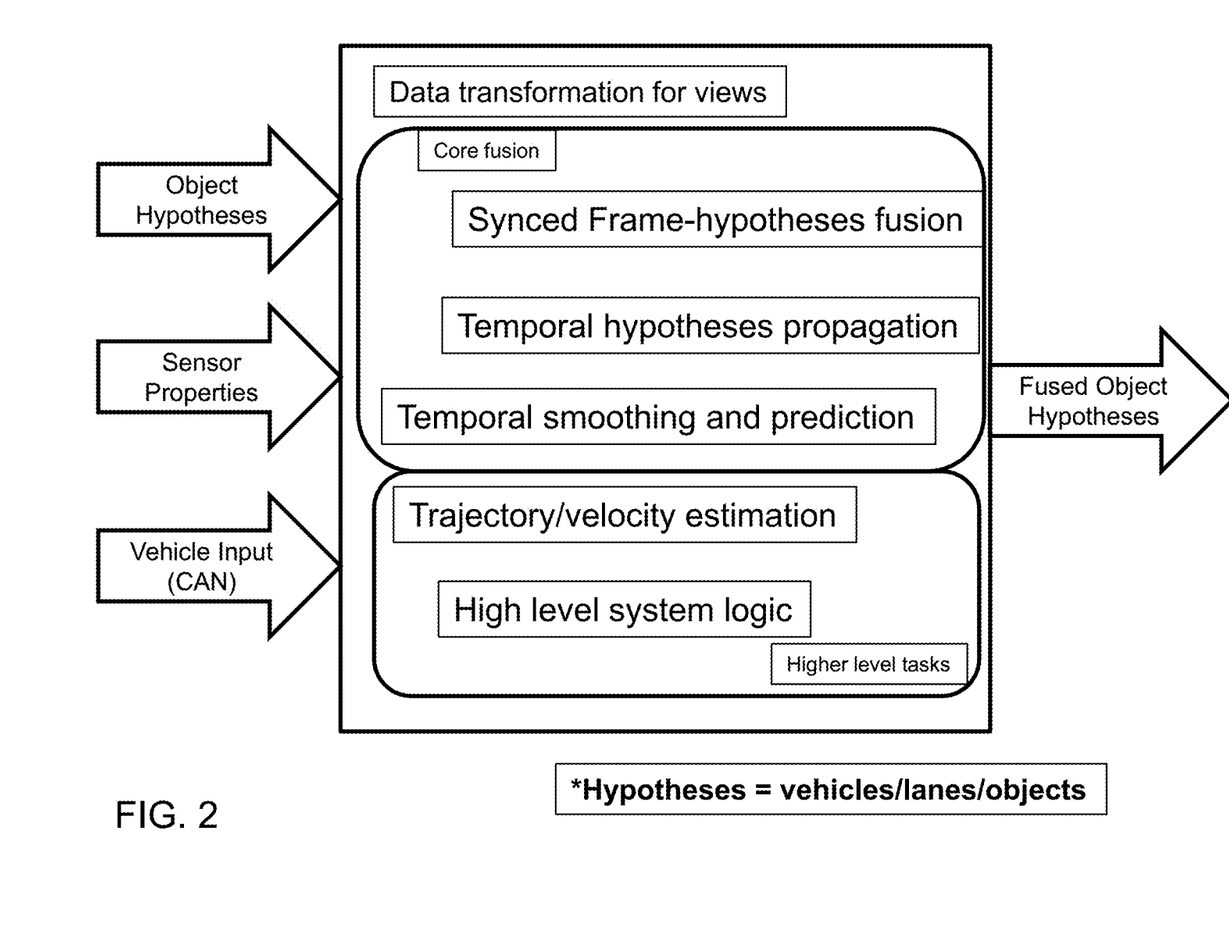
FIG. 2 is a functional block diagram of the object and lane fusion of the present invention.
Figure 3:
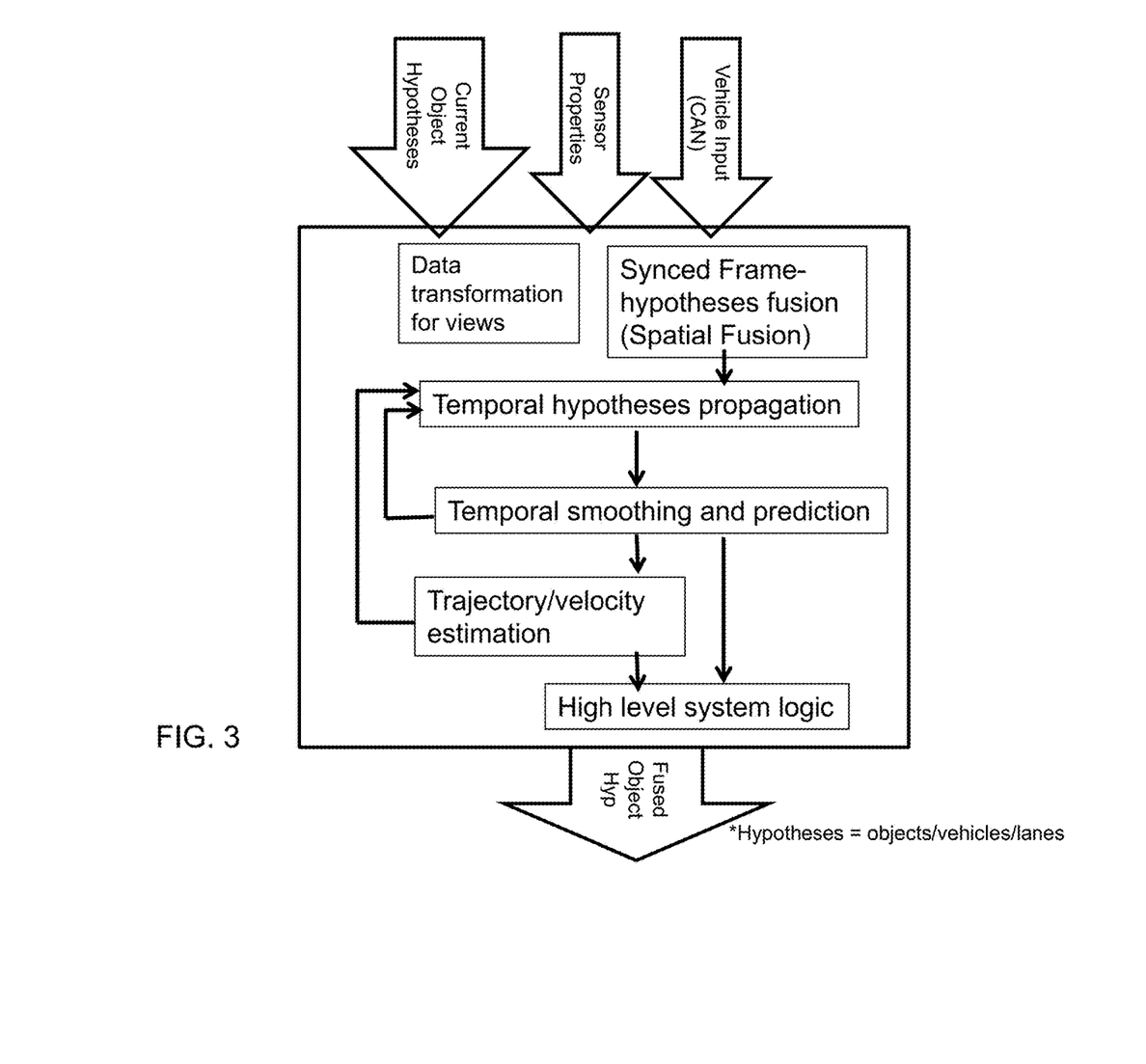
FIG. 3 is another functional block diagram of the object and lane fusion of the present invention.
Figure 4:
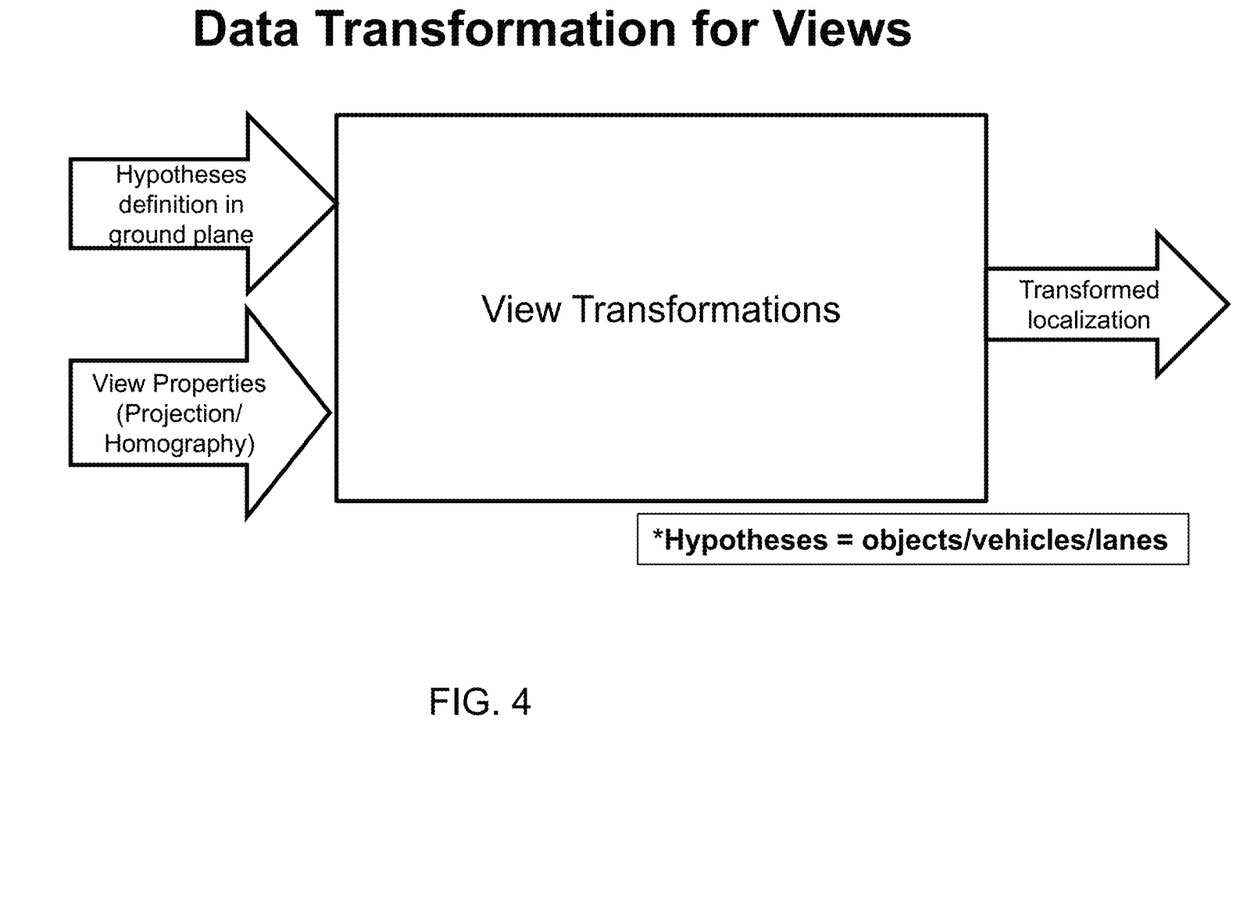
FIG. 4 is a functional block diagram showing data transformation for views in accordance with the present invention.
Figure 5:
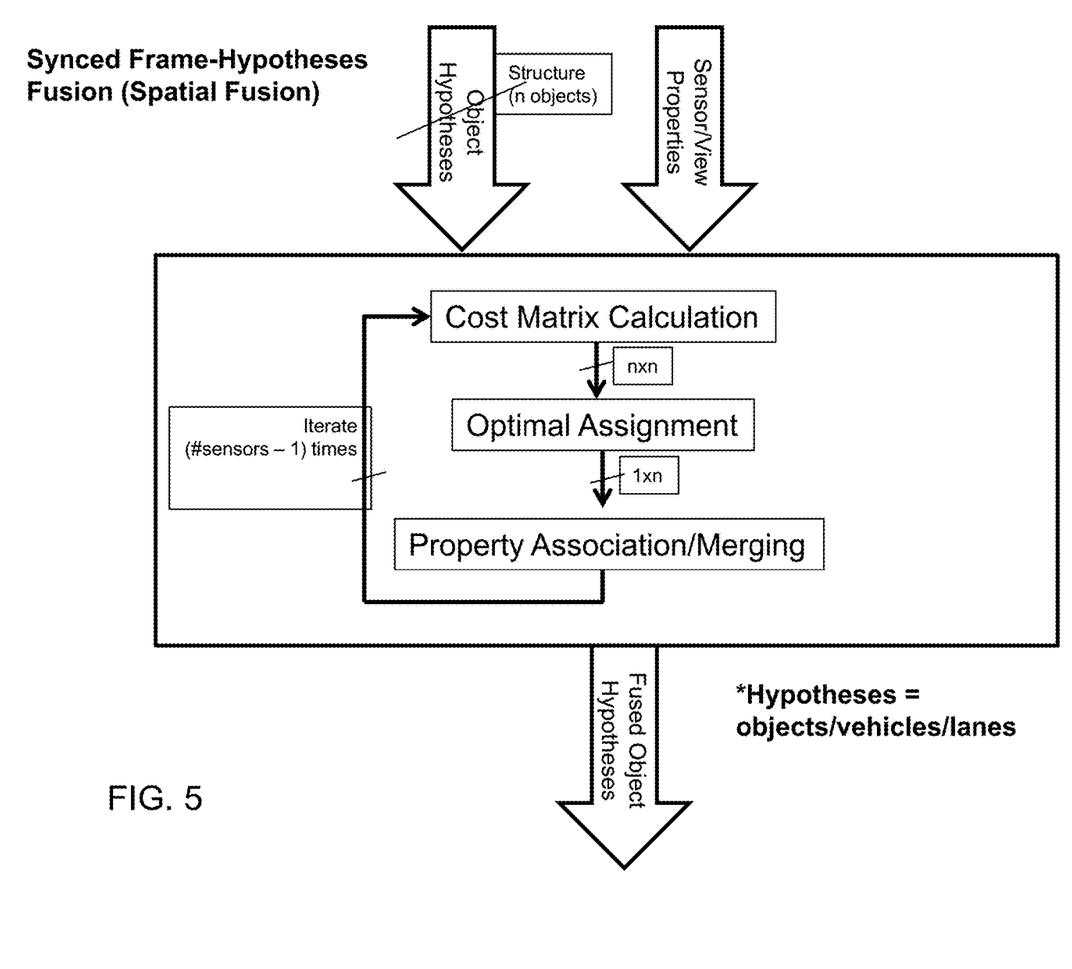
FIG. 5 is a functional block diagram showing synced frame-hypotheses fusion in accordance with the present invention.

As shown in FIGS. 2 and 3, the system receives object hypotheses (which may be generated utilizing aspects of the systems described in U.S. patent application Ser. No. 15/221,912, filed Jul. 28, 2016 by Gupta et al. for VEHICLE VISION SYSTEM WITH OBJECT DETECTION, and published Feb. 2, 2017 as U.S. Publication No. US-2017/0032198, which is hereby incorporated herein by reference in its entirety), sensor properties and vehicle inputs (such as via a CAN bus communication) as inputs and performs a data transformation to generate fused object hypotheses. The data transformation includes core fusion (comprising synched frame-hypotheses fusion and temporal hypotheses propagation and temporal smoothing and prediction) and higher level tasks (such as trajectory/velocity estimation and high level system logic). As shown in FIG. 4, the system may receive hypotheses definition in a ground plane and view properties (projection/homography) and conducts view transformations to generate transformed localization. The system also provides synched frame-hypotheses fusion (spatial fusion), such as shown in FIG. 5, where a cost matrix calculation and optimal assignment and property association/merging are done to generate the fused object hypotheses.

Figure 6:
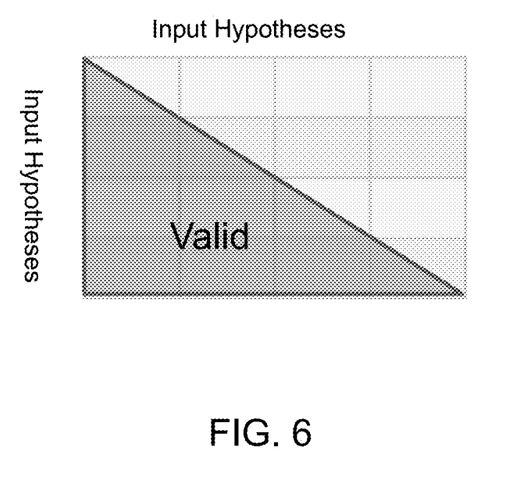
FIG. 6 is a cost function triangular matrix.

The system thus provides a cost matrix calculation, where the input hypotheses list from all sensors forms the two axes for the cost matrix. The cost calculation is conditioned on the sensor-ID (e.g., front, rear, left, right, FFI (forward facing imager, such as at and behind the windshield of the vehicle) and/or the like) and object-ID (e.g., vehicles and/or lanes and/or the like). The cost function includes objects—function (location, velocity) and lanes—function (offset, angle). The cost function is defined by the equation a*norm(prop11, prop12)+b*norm(prop21, prop22), where a,b=1/(estimated data variance). Alternatively, a,b=1/(max allowed deviation). The cost is normalized to 1 using the weighting factors. Objects are unassignable if the cost exceeds 1 or is negative. The cost calculation is limited to a triangular matrix (upper or lower) to limit the duplication of the computation (see FIG. 6).

The system of the present invention may utilize the Hungarian Method (a combinatorial optimization algorithm that solves an assignment problem in polynomial time), which transforms the original matrix to a non-negative matrix, which has a zero assignment by an addition or subtraction operation in each row and column. The algorithm includes the following steps:

Step 1: Subtract the smallest entry in each row from all the entries of its row.
Step 2: Subtract the smallest entry in each column from all the entries of its column. This step is not necessary, but it can reduce the number of iterations later. The only requirement is that it comes to a non-negative matrix.
Step 3: Draw lines through appropriate rows and columns so that all the zero entries of the cost matrix are covered and the minimum number of such lines is used.
Step 4: If the minimum number of covering lines is n, an optimal assignment of zeros is possible and the method is finished. Else continue to step 5.
Step 5: Determine the smallest entry not covered by any line. Subtract this entry from each uncovered row, and then add it to each covered column. Return to Step 3 and continue.

The output of the assignment operation is a vector of assignments (−1 for no assignment).

For each pair of hypotheses identified for assignment, one hypothesis' property is updated while the other one is marked invalid. The updated properties for an object include confidence, location, bounding box, etc., while the updated properties for a lane include confidence, offset, angle, lane type, width, etc. While updating lanes, the following are conditional elements regulate the combination: (i) confidence—as weights for combination, (ii) detected vs predicted and (iii) number of pixels observed in lane marking.

Figure 7:
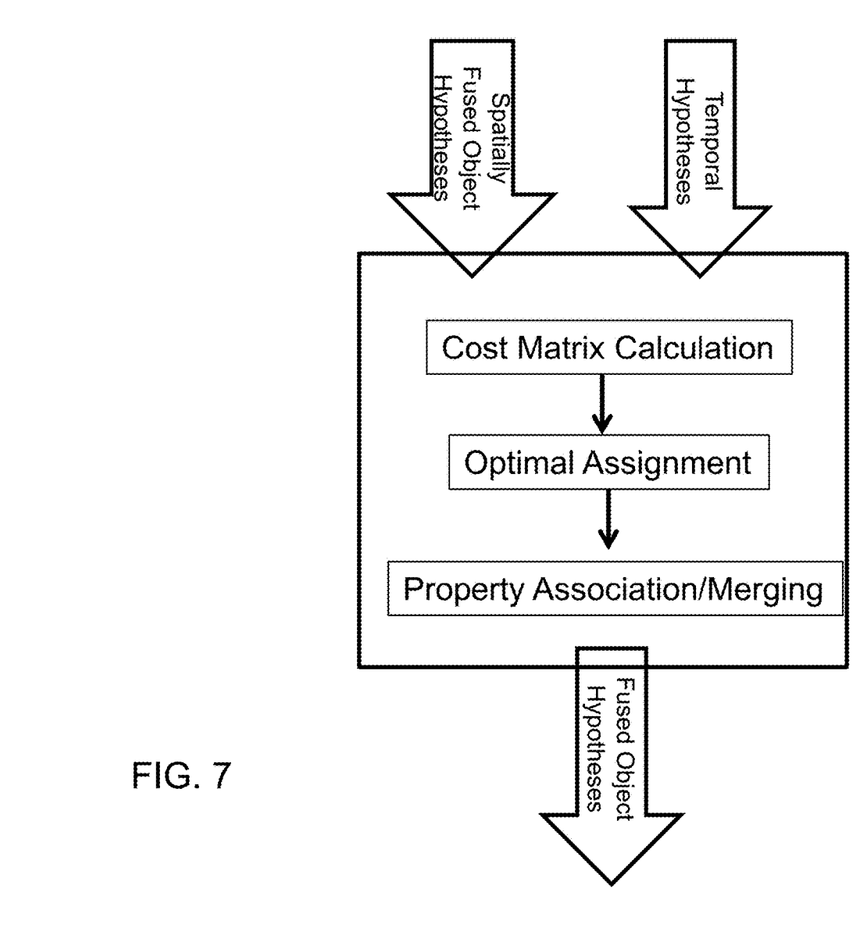
FIG. 7 is a functional block diagram showing temporal hypotheses propagation in accordance with the present invention.

After spatial fusion, the system performs temporal hypotheses propagation (FIG. 7), where a hypotheses map is generated corresponding to the current instance of time in memory. A hypotheses map of the previously tracked data also exists in memory. The system assigns the spatial fused data to the temporal hypotheses to propagate their history in time. Two lists of objects are maintained to allow feedback and prediction in time.

Figure 8:
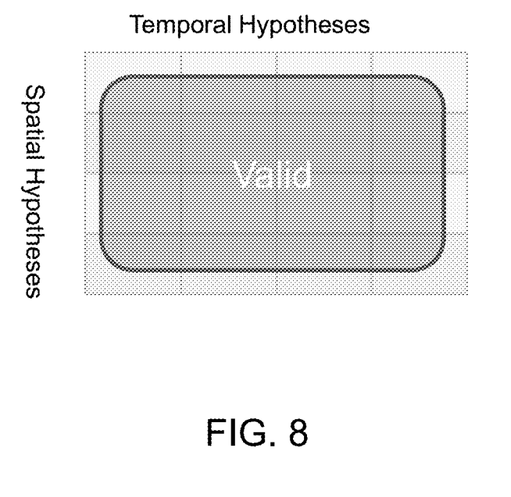
FIG. 8 is a cost matrix with spatial hypotheses and temporal hypotheses forming the two axes for the cost matrix.

Spatial and temporal input hypotheses lists form the two axes for cost matrix (see FIG. 8). The cost calculation is conditioned on valid spatial and temporal hypotheses in structure. The cost function for objects is a function of location, velocity, age, and the cost function for lanes is a function of offset, angle and age. The cost function definition is a*norm(prop11, prop12)+b*norm(prop21, prop22)+c*norm(prop21, prop22), where a,b=1/(estimated data variance). Alternatively: a,b=1/(max allowed deviation). The cost is normalized to 1 using the weights, and objects are unassignable if the cost exceeds 1 or is negative. The subsequent optimal assignment algorithm is similar in operation as discussed above.

For each pair of hypotheses identified for assignment, an updated hypotheses is created with a merged property structure. This uses the earliest available structure in memory for this merger, and if all list elements are occupied for temporal hypotheses then look for most appropriate one to reassign. The updated properties for an object may include confidence, age, location, bounding box and last observation time, while the updated properties for a lane may include confidence, offset, angle, lane type, width, age and last observation time. For those temporal hypotheses in memory with no new assignments, their age is appropriately decremented, and those hypotheses with age 0 or negative are deemed inactive and returned to available pool.

For the updated list of temporal hypotheses, a Kalman filter is used to stabilize the estimated distances over time. For each hypotheses where a new instance is observed. The Kalman filter's covariance matrix is updated based on the observation and sensor resolution at that observation. The full Kalman filter with a measurement update as well as a time update step is performed. For each hypotheses with no new instance, the covariance matrix is propagated, the last predicted value is used as the measurement update and only the time update step is performed. The updated hypotheses are then available with a smoothed estimation and also prediction values to be used within the cost functions of the next step.

The trajectory/velocity estimation is based on the past estimated values, and a running update of the angular trajectory of the object is maintained, while a running update of the velocity is also maintained. The system logic uses, among other inputs (such as, for example, a CAN bus or vehicle network), the estimated trajectory, velocity and the location of the object, and uses filtered lane definitions, and estimates the location of the objects in particular lanes and estimates cut in/lane changes based on defined criteria for such events.

The system of the present invention may utilize aspects of the systems described in U.S. Publication Nos. US-2016-0180180; US-2016-0180182; US-2016-0180158; US-2015-0291215; US-2014-0169627; US-2014-0347486; US-2014-0350834; US-2015-0178576; US-2015-0175072 and/or US-2015-0002670, and/or U.S. patent applications, Ser. No. 15/210,223, filed Jul. 14, 2016, now U.S. Pat No. 10,078,789, Ser. No. 15/150,843, filed May 10, 2016, now U.S. Pat No. 9,898,671, and/or Ser. No. 15/147,301, filed May 5, 2016 and published on Nov. 10, 2016 as U.S. Publication No. US-2016/0325682, and/or U.S. patent application Ser. No. 15/221,912, filed Jul. 28, 2016 by Gupta et al. for VEHICLE VISION SYSTEM WITH OBJECT DETECTION, and published Feb. 2, 2017 as U.S. Publication No. US-2017/0032198, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661; WO 2013/158592 and/or WO 2014/204794, which are all hereby incorporated herein by reference in their entireties. The system may communicate with other communication systems via any suitable means, such as by utilizing aspects of the systems described in International Publication Nos. WO/2010/144900 and/or WO 2013/043661, and/or U.S. Publication No. US-2012-0062743, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:
   at least one camera configured to be disposed at a vehicle equipped with said vision system so as to have a field of view exterior and forward of the vehicle;
   at least one other sensor configured to be disposed at the equipped vehicle so as to have a sensing field exterior of the vehicle;
   a processor operable to process image data captured by said camera and sensor data captured by said sensor;
   wherein, responsive to processing by said processor of captured image data and captured sensor data, an object present in the sensing field of said sensor is determined;
   wherein, responsive to processing of image data captured by said camera, said processor determines lane markings present in the field of view of said camera and forward of the equipped vehicle; and
   wherein said processor receives object hypotheses, sensor properties and vehicle data as inputs and performs a data transformation to generate a fused object hypothesis.

2. The vision system of claim 1, wherein the data transformation includes core fusion.

3. The vision system of claim 2, wherein the core fusion comprises synched frame-hypotheses fusion and temporal hypotheses propagation and temporal smoothing and prediction.

4. The vision system of claim 3, wherein, after synched frame-hypotheses fusion, said vision system performs said temporal hypotheses propagation, where a hypotheses map is generated corresponding to a current instance of time in memory.

5. The vision system of claim 1, wherein said vision system receives hypotheses definition and view properties and conducts view transformations to generate transformed localization.

6. The vision system of claim 5, wherein said vision system provides synched frame-hypotheses fusion and performs a cost matrix calculation.

7. The vision system of claim 6, wherein optimal assignment and property association/merging are performed to generate the fused object hypothesis.

8. The vision system of claim 6, wherein said cost matrix calculation comprises a matrix where an input hypotheses list from said sensors forms two axes for the matrix.

9. The vision system of claim 1, wherein said at least one other sensor comprises at least one other camera.

10. The vision system of claim 1, wherein said processor receives vehicle inputs via CAN bus communications.

11. A vision system of a vehicle, said vision system comprising:
- at least one camera configured to be disposed at a vehicle equipped with said vision system so as to have a field of view exterior and forward of the vehicle;
- at least one other sensor configured to be disposed at the equipped vehicle so as to have a sensing field exterior of the vehicle;
- a processor operable to process image data captured by said camera and sensor data captured by said sensor;
- wherein, responsive to processing by said processor of captured image data and captured sensor data, an object present in the sensing field of said sensor is determined;
- wherein, responsive to processing of image data captured by said camera, said processor determines lane markings present in the field of view of said camera and forward of the equipped vehicle;
- wherein said processor receives object hypotheses, sensor properties and vehicle data as inputs and performs a data transformation to generate a fused object hypothesis;
- wherein said processor receives vehicle inputs via CAN bus communications; and
- wherein the data transformation includes core fusion that comprises synched frame-hypotheses fusion and temporal hypotheses propagation and temporal smoothing and prediction.

12. The vision system of claim 11, wherein, after synched frame-hypotheses fusion, said vision system performs said temporal hypotheses propagation, where a hypotheses map is generated corresponding to a current instance of time in memory.

13. The vision system of claim 11, wherein said vision system receives hypotheses definition and view properties and conducts view transformations to generate transformed localization.

14. The vision system of claim 11, wherein said at least one other sensor comprises at least one other camera.

15. The vision system of claim 11, wherein said vision system provides synched frame-hypotheses fusion and performs a cost matrix calculation.

16. A vision system of a vehicle, said vision system comprising:
- at least one camera configured to be disposed at a vehicle equipped with said vision system so as to have a field of view exterior and forward of the vehicle;
- at least one other sensor configured to be disposed at the equipped vehicle so as to have a sensing field exterior of the vehicle;
- a processor operable to process image data captured by said camera and sensor data captured by said sensor;
- wherein, responsive to processing by said processor of captured image data and captured sensor data, an object present in the sensing field of said sensor is determined;
- wherein, responsive to processing of image data captured by said camera, said processor determines lane markings present in the field of view of said camera and forward of the equipped vehicle;
- wherein said processor receives object hypotheses, sensor properties and vehicle data as inputs and performs a data transformation to generate a fused object hypothesis;
- wherein said processor receives vehicle inputs via CAN bus communications; and
- wherein said vision system receives hypotheses definition and view properties and conducts view transformations to generate transformed localization.

17. The vision system of claim 16, wherein said vision system provides synched frame-hypotheses fusion and performs a cost matrix calculation.

18. The vision system of claim 17, wherein optimal assignment and property association/merging are performed to generate the fused object hypothesis.

19. The vision system of claim 17, wherein said cost matrix calculation comprises a matrix where an input hypotheses list from said sensors forms two axes for the matrix.

20. The vision system of claim 16, wherein said at least one other sensor comprises at least one other camera.

* * * * *